(12) United States Patent
Tsunoda et al.

(10) Patent No.: US 9,352,770 B2
(45) Date of Patent: May 31, 2016

(54) ELECTRIC POWER STEERING APPARATUS

(71) Applicant: NSK Ltd., Shinagawa-ku, Tokyo (JP)

(72) Inventors: Mikihiko Tsunoda, Gunma (JP);
Mitsunori Okubo, Gunma (JP);
Tamotsu Oumi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/443,718

(22) PCT Filed: Oct. 1, 2014

(86) PCT No.: PCT/JP2014/005022
§ 371 (c)(1),
(2) Date: May 19, 2015

(87) PCT Pub. No.: WO2015/052897
PCT Pub. Date: Apr. 16, 2015

(65) Prior Publication Data
US 2015/0274202 A1    Oct. 1, 2015

(30) Foreign Application Priority Data
Oct. 10, 2013  (JP) ................. 2013-213074

(51) Int. Cl.
*B62D 5/04* (2006.01)
*B62D 6/10* (2006.01)

(52) U.S. Cl.
CPC .............. *B62D 5/0463* (2013.01); *B62D 5/04* (2013.01); *B62D 5/0409* (2013.01); *B62D 5/049* (2013.01); *B62D 5/0484* (2013.01); *B62D 6/10* (2013.01)

(58) Field of Classification Search
CPC ...... B62D 5/0463; B62D 5/04; B62D 5/0484; B62D 5/049; B62D 6/10
See application file for complete search history.

(56) References Cited

U.S. PATENT DOCUMENTS

2007/0000717 A1    1/2007  Kumaido et al.
2009/0294208 A1*  12/2009  Nishimura ........... B62D 5/0493
                                                180/446

FOREIGN PATENT DOCUMENTS

| JP | 2005-75026 A | 3/2005 |
|---|---|---|
| JP | 2005-206070 A | 8/2005 |
| JP | 2005-319931 A | 11/2005 |
| JP | 2006-51912 A | 2/2006 |
| JP | 3923957 B2 | 6/2007 |
| JP | 2007-196829 A | 8/2007 |

OTHER PUBLICATIONS

International Search Report (PCT/ISA/210) dated Jan. 13, 2015, with English translation (four (4) pages).
Written Opinion (PCT/ISA/237) dated Jan. 13, 2015, with English translation (six (6) pages).

\* cited by examiner

*Primary Examiner* — Tony Winner
*Assistant Examiner* — Marlon Arce
(74) *Attorney, Agent, or Firm* — Crowell & Moring LLP

(57) ABSTRACT

There is provided an electric power steering apparatus capable of dealing with abnormality when the abnormality happens in the torque, without being affected by an abnormal torque signal and without giving the driver a feeling of strangeness. Abnormality is detected with a double detection configuration including a main ECU clip and a sub ECU interlock. Then when abnormality is detected in steering torque detected by a torque sensor, the input of a main ECU clip is switched from the steering torque detected by the torque sensor to a torque alternative value, and the input value of the sub ECU interlock is switched from a steering assist command value subjected to limiting at the main ECU clip to zero.

6 Claims, 5 Drawing Sheets

ELECTRIC POWER STEERING APPARATUS

TECHNICAL FIELD

The present disclosure relates to an electric power steering apparatus including an electric motor that generates steering assist torque given to a steering mechanism.

BACKGROUND ART

Conventionally electric power steering apparatuses are in widespread use as a steering apparatus, which are configured to give a steering assist force to a steering mechanism by driving an electric motor in accordance with the steering torque of a steering wheel steered by a driver.

Patent Literature 1, for example, describes a technique for such an electric power steering apparatus. This technique is configured to, if abnormality is detected in the output value of a torque sensor, control an electric motor using an alternative value calculated based on the past output value of the torque sensor. This can ease a sudden change in assisting when abnormality occurs at the torque sensor.

Recent electric power steering apparatuses, however, are required to have a double safety configuration from demanding for a redundant system of the steering function. Patent Literature 2, for example, describes a technique for such an electric power steering apparatus. This technique is configured to provide an abnormality detection function at a sub-microcomputer, and to permit the operation of power-steering only when a main microcomputer drives a motor in the driving permissive range, and to prohibit the operation of power-steering in the prohibition range. This can prevent serious abnormality where the generated assist torque value is different from the steering direction.

CITATION LIST

Patent Literatures

PTL 1: JP 2005-75026 A
PTL 2: JP 3923957 B2

SUMMARY

Technical Problem

In the technique described in PTL 2, however, the sub-microcomputer is configured to directly fetch a torque signal from the torque sensor, and so if the torque sensor generates short-circuit or ground fault, the abnormality detection function is activated with an abnormal torque value. That is, this configuration prohibits the operation of power steering immediately when the abnormality occurs, which gives the driver a feeling of strangeness, such as a sudden increase in steering load on the driver.

Then, the present disclosure aims to provide an electric power steering apparatus capable of dealing with abnormality when it happens in the torque, without being affected by an abnormal torque signal and without giving the driver a feeling of strangeness.

Solution to Problem

In order to solve the problems, according to one aspect of the present disclosure, there is provided an electric power steering apparatus including an electric motor configured to give a steering system a steering assist force to reduce steering load on a driver; a torque detection unit configured to detect steering torque; a steering assist command value calculation unit configured to calculate a steering assist command value at least based on the steering torque detected by the torque detection unit; a clipping unit configured to limit, using a predetermined limiting value, the steering assist command value calculated by the steering assist command value calculation unit so as not to exceed an acceptable range based on the steering torque detected by the torque detection unit; and a motor control unit configured to perform driving control of the electric motor based on the steering assist command value limited by the clipping unit. The apparatus further includes: an interlock unit having a monitoring function to permit or prohibit the driving control of the electric motor by the motor control unit based on the steering torque detected by the torque detection unit and the steering assist command value limited by the clipping unit; a torque abnormality detection unit configured to detect an abnormality of the steering torque detected by the torque detection unit; and a torque alternative value calculation unit configured to calculates a steering torque alternative value when the torque abnormality detection unit detects the abnormality, based on normal steering torque that is detected by the torque detection unit when the abnormality is not detected. The apparatus further includes: an input switching unit configured to switch an input value of the clipping unit from the steering torque detected by the torque detection unit to the steering torque alternative value calculated by the torque alternative value calculation unit, when the torque abnormality detection unit detects the abnormality; and an interlock mask unit configured to, switch an input value of the interlock unit from the steering assist command value limited by the clipping unit to zero, when the torque abnormality detection unit detects the abnormality.

In this way, the steering assist command value is monitored by the clipping unit and the interlock unit, and thus a double safety configuration is obtained. This can improve reliability of the system. When abnormality occurs in the torque system, the steering torque to be input to the clipping unit is switched to a past torque value, and the steering assist command value to be input to the interlock unit is set at zero, whereby clipping and interlocking can be performed without being affected by an abnormal torque signal. Especially, this can securely prevent the failure to deal with abnormality because an interlock function is activated when abnormality occurs, and so abnormality can be dealt with without stopping the assist suddenly and without giving the driver a feeling of strangeness.

The above apparatus may include a main control unit and a sub control unit that are capable of performing data communication with each other, and the main control unit may include the steering assist command value calculation unit, the clipping unit, the motor control unit, the torque abnormality detection unit, the torque alternative value calculation unit, the input switching unit, and the interlock mask unit, and the sub control unit may include the interlock unit. This can configure a double safety configuration with the clipping unit of the main control unit and the interlock unit of the sub control unit. When abnormality occurs in the torque system, the input switching unit and the interlock mask unit of the main control unit keep the assisting and the sub control unit can activate the interlock function to prevent sudden stopping of the assist. As a result, this can deal with abnormality securely without giving the driver a feeling of strangeness.

The above apparatus may include a clipping abnormality detection unit configured to detect an abnormality at the clipping unit based on a comparison result between the steering assist command value input to the clipping unit and the steering assist command value output from the clipping unit. This can secure reliability of the system even when the interlock function is made disabled after the occurrence of abnormality.

The above apparatus may include an abnormal detection result determination unit configured to determine validity of a result of abnormality detection by the torque abnormality detection unit based on a comparison result between the steering torque detected by the torque detection unit and the steering torque to be input to the clipping unit out of the steering torque detected by the torque detection unit and the steering torque alternative values calculated by the torque alternative value calculation unit. The interlock mask unit may switch the input value of the interlock unit from the steering assist command value limited by the clipping unit to zero, only in a case in which the torque abnormality detection unit detects the abnormality and the abnormal detection result determination unit confirms the validity of the result of the abnormality detection by the torque abnormality detection unit. This can make the interlock function disabled only when abnormality occurs, and so keep the safety.

In the above apparatus, the clipping unit may include a gradually-changing unit configured to gradually change the limiting value toward zero, when the torque abnormality detection unit detects the abnormality. This can limit the assist gently without turning the assist OFF immediately when abnormality occurs, and so the system can be stopped safely while suppressing the driver's feeling of strangeness.

In the above apparatus, the torque alternative value calculation unit may calculate, as the steering torque alternative value, a minimum value of normal steering torque values detected by the torque detection unit within a predetermined period of time immediately before the torque abnormality detection unit detects the abnormality. This can set the system to the safety side when abnormality occurs.

Advantageous Effects

According to the present disclosure, the apparatus can deal with abnormality when the abnormality happens in the torque, without being affected by an abnormal torque signal. Then when the abnormality occurs in the torque, the system can be stopped without stopping the assist suddenly and safely without giving the driver a feeling of strangeness.

DESCRIPTION OF EMBODIMENTS

Figure 1:
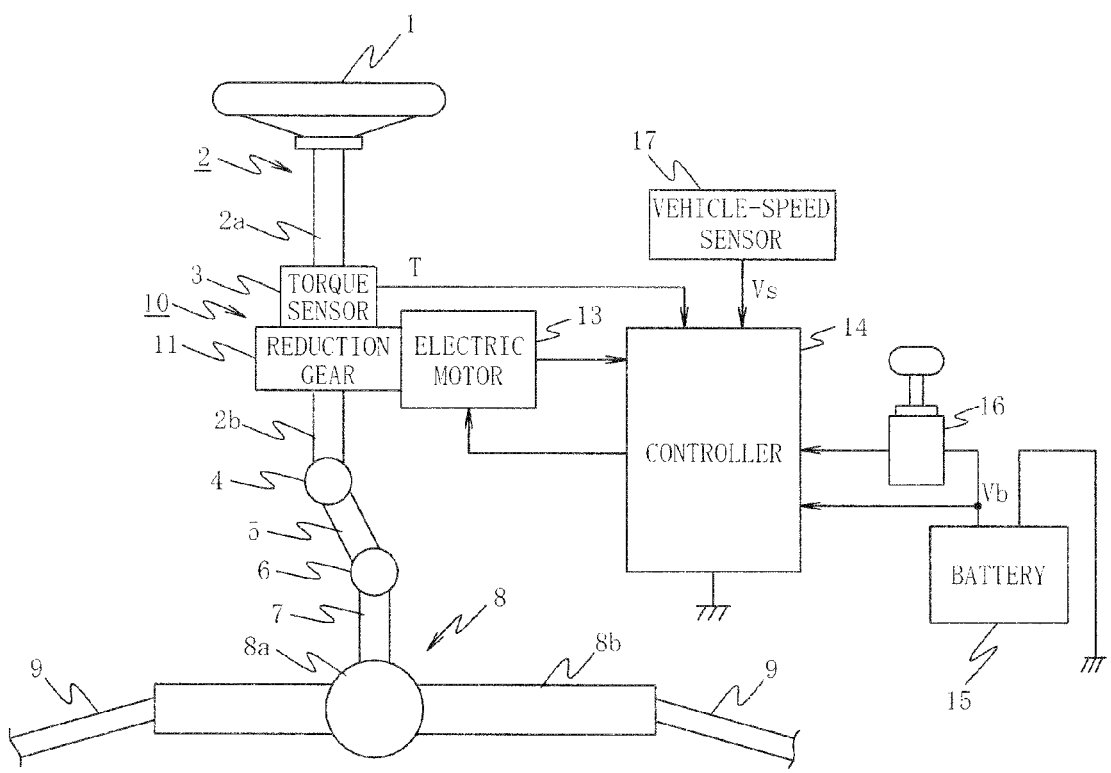
FIG. 1 illustrates the overall configuration of an electric power steering apparatus according to the present disclosure.

Embodiments of the present disclosure will now be described with reference to the drawings.
FIG. 1 illustrates the overall configuration of an electric power steering apparatus according to the present disclosure.
In the drawing, reference numeral 1 denotes a steering wheel of a vehicle, and steering force acting on this steering wheel 1 through the action of a driver is transmitted to a steering shaft 2 having an input shaft 2a and an output shaft 2b. The input shaft 2a of this steering shaft 2 has one end jointed to the steering wheel 1 and the other end jointed to one end of the output shaft 2b via a steering torque sensor 3.

Then the steering force transmitted to the output shaft 2b is transmitted to an intermediate shaft 5 via a universal joint 4, and is then transmitted to a pinion shaft 7 via a universal joint 6. The steering force transmitted to this pinion shaft 7 is transmitted to tie rods 9 via a steering gear 8, and thus wheels (not illustrated) are turned. The steering gear 8 employs a rack-and-pinion type having a pinion 8a jointed to the pinion shaft 7 and racks 8b meshing with the pinion 8a, and transforms rotational movement transmitted to the pinion 8a into translatory movement by the racks 8b.

The output shaft 2b of the steering shaft 2 is joined to a steering assist mechanism 10 that transmits steering assist force to the output shaft 2b. This steering assist mechanism 10 includes a reduction gear 11 joined to the output shaft 2b and an electric motor 13 that is joined to this reduction gear 11, and generates steering assist force for the steering system.

The steering torque sensor 3 detects steering torque given to the steering wheel 1 and transmitted to the input shaft 2a. The steering torque sensor, for example, is configured to transform the steering torque into a torsional angle displacement of a torsion bar not illustrated that is interposed between the input shaft 2a and the output shaft 2b, detect this torsional angle displacement in the form of a magnetic signal, and convert it into an electrical signal.

The steering torque sensor 3 detects steering torque given to the steering wheel 1 and transmitted to the input shaft 2a, and is configured to detect a relative displacement (rotational displacement) between the input shaft 2a and the output shaft 2b, which are jointed with the torsion bar not illustrated, by corresponding to the relative displacement to a change in impedance of a coil pair. The torque detection value T output from this steering torque sensor 3 is input to a controller (ECU) 14.

The controller 14 operates with power supplied from a battery 15 that is a vehicle-mounted power supply. The cathode of the battery 15 is grounded, and the anode is connected to the controller 14 via an ignition switch 16 that activates the engine, and is connected directly to the controller 14 without the ignition switch 16 between them.

The controller 14 receives, as an input, a vehicle-speed detection value Vs detected by a vehicle-speed sensor 17 as well as the torque detection value T. Then, the controller performs steering assist control to give the steering assist force corresponding to them to the steering system. Specifically, a steering assist command value (steering assist torque command value) to generate the steering assist force at the electric motor 13 is calculated by a known procedure, and a current command value for the electric motor 13 is calculated based on the calculated steering assist command value. Then, driving current to be supplied to the electric motor 13 is feed-back controlled based on the calculated current command value and the motor current detection value.

Next, the following describes a specific configuration of the controller 14.

Figure 2:
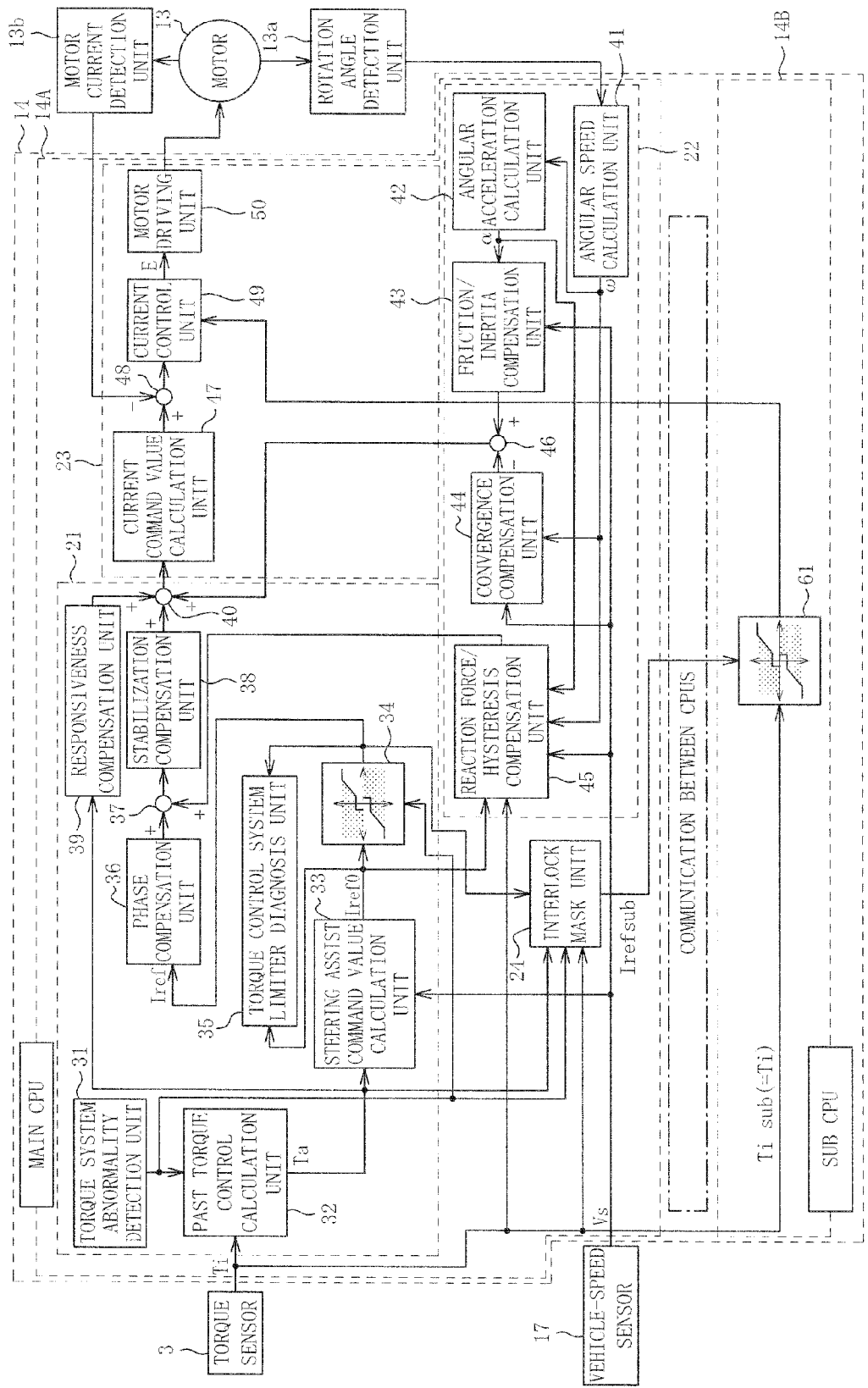
FIG. 2 is a block diagram illustrative of a specific configuration of a controller.

As illustrated in FIG. 2, the controller 14 includes a main CPU 14A and a sub CPU 14B. The main CPU 14A includes a command value calculation unit 21 that calculates the steering assist command value (steering assist torque command value), a command value compensation unit 22 that compensates for the steering assist command value, a motor control unit 23 that performs the driving control of the electric motor 13 based on the steering assist command value compensated at the command value compensation unit 22, and an interlock mask unit 24.

The command value calculation unit 21 includes a torque system abnormality detection unit 31, a past torque control calculation unit 32, a steering assist command value calculation unit 33, a main ECU clip (q-axis current clip) 34, a torque control system limiter diagnosis unit 35, a phase compensation unit 36, an adder 37, a stabilization compensation unit 38, a responsiveness compensation unit 39 and an adder 40.

Figure 3:
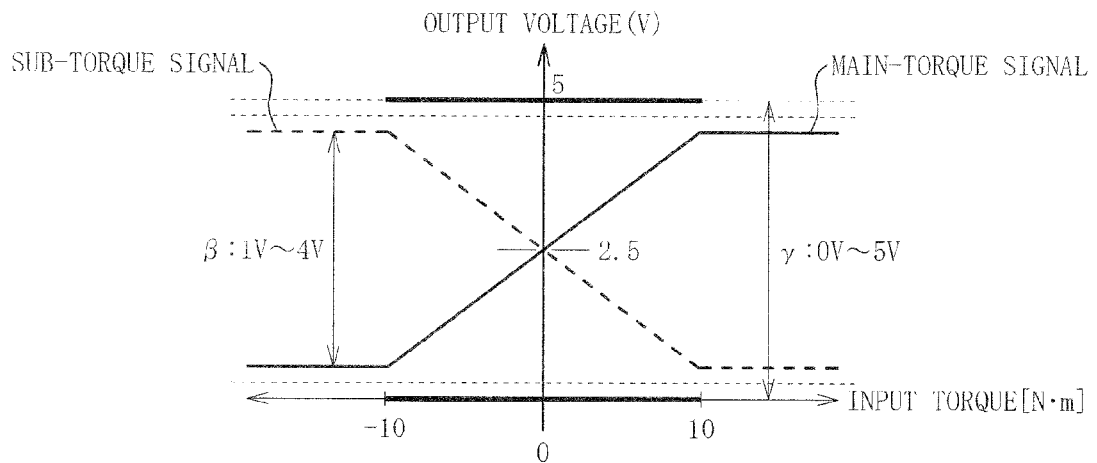
FIG. 3 illustrates characteristic lines of torque.

The torque system abnormality detection unit 31 detects an abnormal output value of the torque sensor 3, and outputs the result as a torque system abnormality generation flag. As illustrated in FIG. 3, the output value of the torque sensor 3 has a cross property in which a main torque signal and a sub-torque signal cross during the normal operation. The rated range of the torque sensor 3 is 0 V to 5 V indicated with symbol $\gamma$, and the normal operating area, which is set inwardly of the rated range by a mechanical stopper (torsion range of the torsion bar, for example), is 1 V to 4 V indicated with symbol $\beta$.

If the torque sensor 3 generates short-circuit or ground fault, the main torque signal and the sub-torque signal are fixed to the upper and lower limits (0 V, 5 V) of the rated range of the torque sensor 3. Then, when the main torque signal and the sub-torque signal are a predetermined value around 0 V (e.g., 0.3 V) or lower or a predetermined value around 5 V (e.g., 4.7 V) or more, the main torque signal and the sub-torque signal are considered as deviating from the normal cross property, and the torque system abnormality generation flag is turned ON, indicating abnormality. When the main torque signal and the sub-torque signal have a normal cross property, then torque system abnormality generation flag is turned OFF, indicating abnormality not generated.

Referring back to FIG. 2, the past torque control calculation unit 32 receives, as an input, steering torque Ti (steering torque T at time i) that is detected by the torque sensor 3, and outputs steering torque Ta in accordance with the torque system abnormality generation flag output from the torque system abnormality detection unit 31. Herein the past torque control calculation unit 32 outputs steering torque Ti as the steering torque Ta when the torque system abnormality generation flag is OFF, and outputs normal steering torque (past torque value) detected by the torque sensor 3 prior to the generation of the torque system abnormality as the steering torque Ta when the torque system abnormality generation flag is ON.

Figure 4:
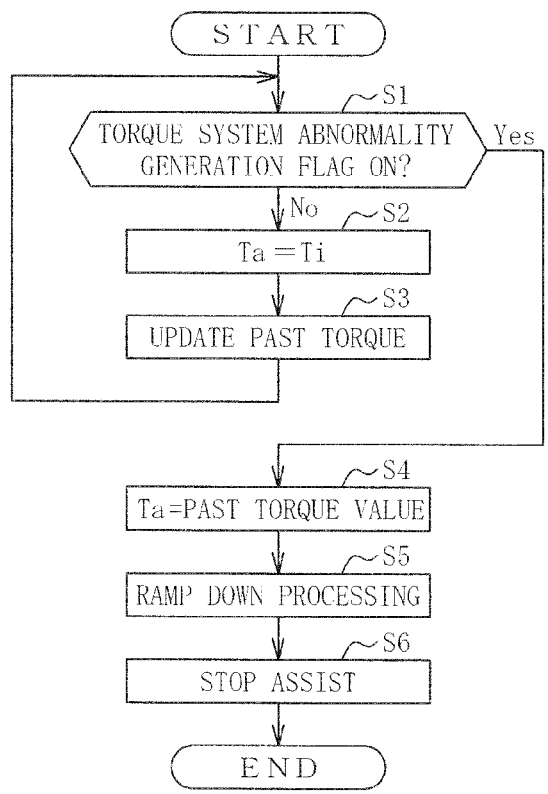
FIG. 4 is a flowchart illustrative of past torque control processing procedure.

FIG. 4 is a flowchart illustrative of past torque control processing procedure executed by the past torque control calculation unit 32.

Firstly at step S1, the past torque control calculation unit 32 determines whether the torque system abnormality generation flag is ON or not. When the torque system abnormality generation flag is OFF, it is determined that no abnormality occurs in the torque system, and then the procedure shifts to step S2. When the torque system abnormality generation flag is ON, it is determined that abnormality occurs in the torque system, and the procedure shifts to step S4 described later.

At step S2, the past torque control calculation unit 32 acquires steering torque Ti from the torque sensor 3, and sets this as steering torque Ta for outputting, and then the procedure shifts to step S3.

At step S3, the past torque control calculation unit 32 updates the past torque value, and then the procedure shifts to step S1 as stated above. Herein the past torque value is a minimum value of the detected steering torque values (past torque detection values) of preceding n samples (e.g., 6 samples). The following description refers to a past torque detection value 6 samples before as T(i−6), a past torque detection value 5 samples before as T(i−5), . . . and a past torque detection value 1 sample before as T(i−1).

At this step S3, the past torque control calculation unit 32 firstly updates the past torque detection values T(i−6), T(i−5), . . . , T(i−1) stored in a memory. That is, setting is performed so that T(i−6)=T(i−5), T(i−5)=T(i−4), . . . , T(i−1)=Ti, and then the past torque detection values in the memory are rewritten. Next, the minimum value is selected from these past torque detection values, and the selected minimum value (min(T(i−6), T(i−5), . . . , T(i−1))) is stored as the past torque value in the memory.

At step S4, the past torque control calculation unit 32 sets the past torque value stored in the memory as steering torque Ta, and the procedure shifts to step S5.

Figure 5:
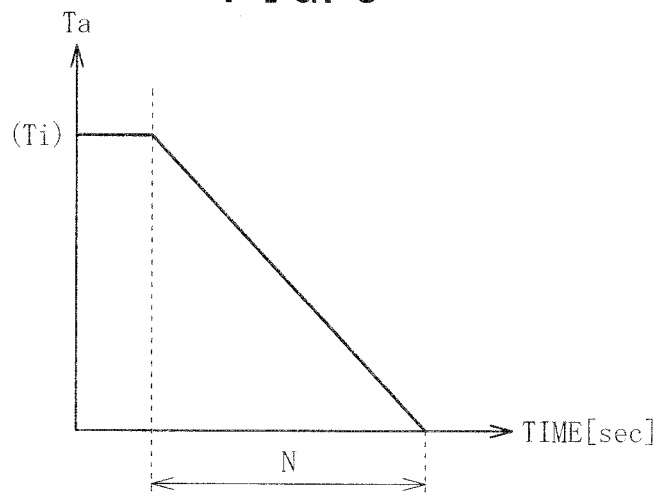
FIG. 5 describes ramp down processing.

At step S5, the past torque control calculation unit 32 performs ramp down processing as illustrated in FIG. 5 to the steering torque Ta. That is, the steering torque Ta is gradually decreased to zero over predetermined time N [sec] while setting the steering torque Ta as a reference when the torque system abnormality occurs that is determined based on the steering torque Ti.

Then, when the steering torque Ta reaches zero, the procedure shifts to S6, where the past torque control calculation unit 32 stops steering assist through steering assist control (stops the electric motor 13) and ends the past torque monitor calculation processing.

Referring back to FIG. 2, the steering assist command value calculation unit 33 calculates the steering assist command value Iref0 while referring to a steering assist command value calculation map or the like based on the steering torque Ta and vehicle speed Vs. The steering assist command value calculation map is configured as a characteristic diagram which represents the steering torque Ta in the horizontal axis and the steering assist command value Iref0 in the vertical axis, and includes the vehicle speed Vs as a parameter. Then the steering assist command value Iref0 is set so as to firstly increase relatively gently with an increase in the steering torque Ta, and as the steering torque Ta further increases, then to steeply increase with such an increase. The characteristic lines have a gradient that decreases with an increase in the vehicle speed Vs. Each characteristic line has an upper limit set.

The main ECU clip 34 limits, using a predetermined limiting value (upper and lower limit values), the steering assist command value Iref0 calculated by the steering assist command value calculation unit 33 so as not to exceed the acceptable range. Herein the limiting value of the steering assist command value Iref0 is determined in accordance with the steering torque Ta output from the past torque control calculation unit 32. This main ECU clip 34 is to detect abnormalities of the steering assist command value Iref0 and abnormalities of the steering direction due to faults (short-circuit, ground fault) of the torque sensor 3.

The torque control system limiter diagnosis unit 35 receives, as an input, the steering assist command value Iref0 calculated at the steering assist command value calculation unit 33 and the steering assist command value Iref subjected to clipping by the main ECU clip 34. Then, based on a result of the comparison of them, the torque control system limiter diagnosis unit diagnoses whether the upper and lower limit clips of the main ECU clip 34 are normal or not.

Figure 6:
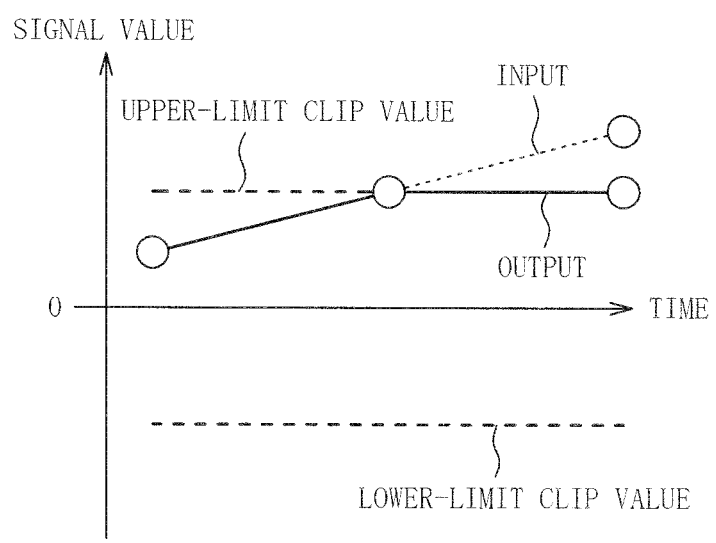
FIG. 6 describes the operation of a limiter function.

FIG. 6 describes the operation of a limiter function. As illustrated with the broken lines of FIG. 6, when the input signal is larger than the upper limit clip value, then the output signal is limited by the upper limit clip value as illustrated with the solid line. That is, the absolute value of the output signal is always equal to or lower than the absolute value of the input signal (|input|≥|output|). The input signal and the output signal always have the same sign.

In this way, the torque control system limiter diagnosis unit 35 compares the input signal Iref0 and the output signal Iref, and if the state of |Iref0|<|Iref| continues for predetermined time (e.g., 10 ms) or if the state of the input signal Iref0 and the output signal Iref having different signs continues for predetermined time (e.g., 10 ms), then it determines that the upper and lower limit clips are abnormal. Then when the upper and lower limit clips are determined as abnormal, then the torque control system limiter diagnosis unit 35 performs processing to stop the assist (stop the electric motor 13).

The phase compensation unit 36 performs phase compensation for the steering assist command value Iref subjected to clipping at the main ECU clip 34, and outputs the steering assist command value subjected to the phase compensation to the adder 37. Herein, a transmission property as in $(T_1s+1)/(T_2s+1)$ may act on the steering assist command value.

The adder 37 adds the steering assist command value subjected to phase compensation output from the phase compensation unit 36 and self-aligning torque (SAT) output from a reaction force/hysteresis compensation unit 45 described later, and outputs the result to the stabilization compensation unit 38.

The stabilization compensation unit 38 removes a peak value of the resonance frequency of a resonance system including an inertia element and a spring element included in the detected torque to compensate for phase shifting of the resonance frequency that impairs the stability and the responsiveness of the control system. For instance, it has a characteristic formula of $G(s)=(s^2+a1 \cdot s+a2)/(s^2+b1 \cdot s+b2)$, where s denotes a Laplace operator. In this characteristic formula $G(s)$, a1, a2, b1, and b2 are parameters that are determined by the resonance frequency of the resonance system.

The responsiveness compensation unit 39 receives, as an input, steering torque Ta, and outputs a responsiveness compensation command value to the adder 40. This responsiveness compensation unit 39 is configured to secure the stability and compensate for static friction at the assist characteristics dead zone.

The adder 40 adds the steering assist command value subjected to stabilization compensation that is output from the stabilization compensation unit 38, the responsiveness compensation command value output from the responsiveness compensation unit 39 and a command compensation value output from a subtracter 46 described later, and then outputs the result as the steering assist command value that is the output result from the command value calculation unit 21 to a current command value calculation unit 47 described later.

The command value compensation unit 22 includes an angular speed calculation unit 41, an angular acceleration calculation unit 42, a friction/inertia compensation unit 43, a convergence compensation unit 44, the reaction force/hysteresis compensation unit 45 and the subtracter 46.

The angular speed calculation unit 41 differentiates the angle of rotation of a motor that is detected at a rotation angle detection unit 13a to calculate a motor angular speed ω.

The angular acceleration calculation unit 42 differentiates the motor angular speed ω calculated at the angular speed calculation unit 41 to calculate a motor angular acceleration α.

The friction/inertia compensation unit 43 compensates for the amount corresponding to the torque generated from inertia of the electric motor 13 based on the motor angular acceleration α calculated at the angular acceleration calculation unit 42 and outputs an inertia compensation value to prevent deterioration in the feeling of inertia or control responsiveness.

The convergence compensation unit 44 outputs a convergence compensation value to compensate for the convergence of a yaw rate based on the motor angular speed ω calculated at the angular speed calculation unit 41. That is, the convergence compensation unit 44 calculates the convergence compensation value to apply a brake to the swinging and rotating action of the steering wheel 1 to improve the convergence in yaw of the vehicle.

The reaction force/hysteresis compensation unit 45 receives, as an input, the steering torque Ti, the vehicle speed Vs, the motor angular speed ω, the motor angular acceleration α, and the steering assist command value Iref0 calculated at the steering assist command value calculation unit 33, estimates and calculates self-aligning torque (SAT) based on them, and outputs the result to the adder 37.

The subtracter 46 subtracts the convergence compensation value calculated at the convergence compensation unit 44 from the inertia compensation value calculated at the friction/inertia compensation unit 43, and outputs the result as the command compensation value that is the output result from the command value compensation unit 22 to the adder 40 as stated above.

The motor control unit 23 includes the current command value calculation unit 47, a subtracter 48, a current control unit 49 and a motor driving unit 50.

The current command value calculation unit 47 calculates the current command value for the electric motor 13 based on the steering assist command value (steering assist torque command value) output from the command value calculation unit 21.

The subtracter 48 calculates a current deviation between the current command value calculated at the current command value calculation unit 47 and the motor current detection value detected at a motor current detection unit 13b, and outputs this to the current control unit 49.

The current control unit 49 performs proportional integration of the current deviation for feed-back control to output a voltage command value E. Herein the current control unit 49 receives, as an input, an assist prohibition signal that a sub ECU interlock 61 described later outputs, and performs assist prohibition processing based on the assist prohibition signal to set the current command value E at zero.

The motor driving unit 50 calculates duty based on the voltage command value E output from the current control unit 49, and calculates a duty ratio as a driving command for the electric motor 13. Then, the electric motor 13 is driven based on the duty ratio.

The interlock mask unit 24 outputs the steering assist command value Irefsub that is to be input to a sub ECU interlock (q-axis current interlock) 61 of a sub CPU 14B described later.

Herein the interlock mask unit 24 receives, as an input, the torque system abnormality generation flag output from the torque system abnormality detection unit 31, the steering torque Ti detected by the torque sensor 3, the steering torque Ta output from the past torque control calculation unit 32, and the steering assist command value Iref subjected to clipping at the main ECU clip 34.

Then when the torque system abnormality generation flag is OFF, the interlock mask unit 24 outputs the steering assist command value Iref (steering assist command value that is generated from the torque detection value detected by the torque sensor 3) as the steering assist command value Irefsub. When the torque system abnormality generation flag is ON but the abnormality detection result from the torque system abnormality detection unit 31 is not appropriate, then the interlock mask unit outputs the steering assist command value Iref (steering assist command value that is generated from the past torque value) as the steering assist command value Irefsub.

Meanwhile when the torque system abnormality generation flag is ON and the abnormality detection result from the torque system abnormality detection unit 31 is appropriate, then the interlock mask unit 24 outputs zero as the steering assist command value Irefsub (limits the steering assist command value Irefsub).

Based on a comparison result between the steering torque Ti and the steering torque Ta, the interlock mask unit 24 determines whether the abnormality detection result at the torque system abnormality detection unit 31 is appropriate or not.

Figure 7:
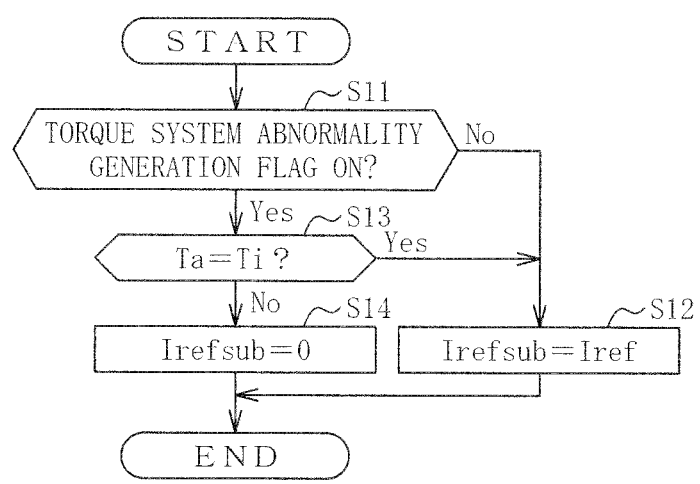
FIG. 7 is a flowchart illustrative of the procedure of interlock current limiting processing.

FIG. 7 is a flowchart illustrative of the procedure of interlock current limiting processing executed at the interlock mask unit 24.

Firstly at step S11, the interlock mask unit 24 determines whether the torque system abnormality generation flag is ON or not. When the torque system abnormality generation flag is OFF, it is determined that no abnormality occurs in the torque system, and the procedure shifts to step S12. When the torque system abnormality generation flag is ON, it is determined that abnormality occurs in the torque system, and the procedure shifts to step S13 described later.

At step S12, the interlock mask unit 24 outputs the steering assist command value Iref subjected to the clipping at the main ECU clip 34 as the steering assist command value Irefsub to be input to the sub ECU interlock 61, and ends the interlock current limiting processing.

At step S13, the interlock mask unit 24 determines whether the steering torque Ti and the steering torque Ta are equal or not. When abnormality occurs in the torque system, and if the past torque control calculation unit 32 functions correctly, the steering torque Ta has a value different from the steering torque Ti. Then, when the torque system abnormality generation flag is ON and Ti≠Ta, then it can be determined that the abnormality detection result at the torque system abnormality detection unit 31 is appropriate.

Then when it is determined as Ti=Ta at this step S13, it is determined that the abnormality detection result at the torque system abnormality detection unit 31 is not appropriate, and then the procedure shifts to step S12 as stated above. That is, when the torque system abnormality generation flag is ON and Ti=Ta, then it is determined that the steering assist command value Iref subjected to clipping by the main ECU clip 34 (steering assist command value generated from the past torque value) may be output as the steering assist command value Irefsub to be input to the sub ECU interlock 61.

On the other hand, when it is determined as Ti≠Ta at the step S13, the procedure shifts to step S14. Then at step S14, the interlock mask unit 24 outputs the steering assist command value Irefsub=0 to be input to the sub ECU interlock 61, and ends the interlock current limiting processing. That is, when the torque system abnormality generation flag is ON and Ti=Ta, then it is determined that the abnormality detection result at the torque system abnormality detection unit 31 is appropriate, and so masking is required so as not to perform the interlock monitoring function using an abnormal torque sensor value.

Referring back to FIG. 2, the sub CPU 14B includes the sub ECU interlock (q-axis current interlock) 61. This sub CPU 14B can transmit/receive data to/from the main CPU 14A through a communication between CPUs.

The sub ECU interlock 61 receives, as an input, the steering torque Ti detected by the torque sensor 3 and the steering assist command value Irefsub output from the interlock mask unit 24. Then based on them, the sub ECU interlock performs interlock monitoring to permit or prohibit the driving control of the electric motor 13.

That is, the sub ECU interlock 61 determines whether the steering torque Ti and the steering assist command value Irefsub are within a predetermined driving prohibit range of the electric motor 13 or not. Then when it is determined that they are in the driving prohibit range, the sub ECU interlock starts a timer and outputs an assist prohibit signal to the current control unit 49 after certain time to forcibly stop the driving of the electric motor 13.

In this way, q-axis current clipping at the main CPU 14A and q-axis current interlock at the sub CPU 14B perform double monitoring of abnormalities of the steering assist command value generated from the steering torque Ti and of the steering direction due to faults (short-circuit, ground) of the torque sensor.

When an abnormality occurs in the torque sensor, then the past torque value is used as an alternative value of the steering torque detection value to generate the current command value. At this time, the steering assist command value Irefsub to be input to the q-axis current interlock at the sub CPU 14B is set at zero [A], so as to make the q-axis current interlock disabled. Further, a torque control system limiter diagnosis function is added to the main CPU 14A, whereby deterioration in reliability resulting from the q-axis current interlock being disabled is suppressed.

Herein the steering torque sensor 3 corresponds to a torque detection unit. In FIG. 2, the main CPU 14A corresponds to a main control device, the sub CPU 14B corresponds to a sub-control device, the motor control unit 23 corresponds to a motor control unit and the torque system abnormality detection unit 31 corresponds to a torque abnormality detection unit. Then the steering assist command value calculation unit 33 corresponds to a steering assist command value calculation unit, the main ECU clip 34 corresponds to a clipping unit, and the torque control system limiter diagnosis unit 35 corresponds to a clipping abnormality detection unit. The sub ECU interlock 61 corresponds to an interlock unit.

Then in FIG. 4, step S3 corresponds to a torque alternative value calculation unit, step S4 corresponds to an input switching unit and step S5 corresponds to a gradually-changing unit. In FIG. 7, step S13 corresponds to an abnormal detection result determination unit and step S14 corresponds to an interlock mask unit.

Next, the following describes the operation and advantageous effects of the present embodiment.

When the driver turns the ignition switch 16 ON, then control power is supplied from the battery 15 to the controller 14, so that the controller 14 becomes activated. At this time, the controller 14 performs the steering assist control based on the steering operation by the driver.

For instance, when the driver starts the vehicle to move and travel while turning along a curved road, then the controller 14 calculates the steering assist command value based on the steering torque Ta(=Ti) and the vehicle speed Vs, and calculates the current command value for the electric motor 13 based on the steering assist command value. Next, the controller calculates the voltage command value E based on the calculated current command value and the motor current detection value. Then the driving control of the electric motor 13 is performed based on the calculated voltage command value E, and then the torque generated by the electric motor 13 is converted into rotation torque at the steering shaft 2 via the reduction gear 11, with which the steering force is assisted for the driver. In this way, the steering load on the driver is reduced.

At this time, the main ECU clip 34 of the main CPU 14A monitors whether the value obtained by converting the steering torque Ta into the steering assist command value Iref0 is appropriate or not for the steering direction and the detected torque amount. Then, the steering assist command value is limited in this case so as not to exceed the acceptable range.

Then the steering assist command value Iref subjected to the limiting is input to the sub ECU interlock 61 of the sub CPU 14B for monitoring whether the steering assist command value Iref subjected to the limiting is appropriate or not for the steering direction and the detected torque amount. That is, abnormality is detected with such a double detection configuration including the main CPU 14A and the sub CPU 14B, whereby reliability of the system can be improved.

In this way, the main ECU clip 34 is provided downstream of the steering assist command value calculation unit 33 for monitoring of correlation between the current command value and the steering torque and for detecting of opposite phase of the torque mainly. To preform phase compensation, responsiveness compensation and convergence compensation, opposite phase of the torque detection value may be output, and so in order not to impair such compensation, the main ECU clip 34 provided immediately after the steering assist command value calculation unit 33 monitors the abnormality of the system mainly.

Then if the torque system abnormality occurs due to a fault at the torque sensor 3 from this state, the main CPU 14A performs steering assist control using the past torque value instead of the steering torque Ti detected by the torque sensor 3. That is, the input value Ta of the steering assist command value calculation unit 33 is switched from the steering torque Ti to the past torque value.

At this time, the main CPU 14A performs ramp down control to gradually decrease the steering torque Ta as the input value of the main ECU clip 34. The gradually decreasing of the steering torque Ta enables a change of the limiting value (upper and lower limit values) for the steering assist command value Iref0 used at the main ECU clip 34 gradually toward zero, enabling to gradually limit the assist as a result. Then, the assist is completely stopped after predetermined time (N [sec]) of the beginning of this ramp down control.

In this way, when abnormality occurs at the output value of the torque sensor 3, the steering assist control is switched so as to use the past torque value, thereby preventing the steering assist control using an abnormal torque value and so easing a sudden change of assisting. Then since ramp down control is performed when abnormality occurs, assist can be limited gently without immediately turning the assist OFF. Further the steering torque Ta input to the main ECU clip 34 is gradually reduced for the ramp down control, the gradual-reducing of the assist can be performed with a relatively simple configuration.

Meanwhile, when this abnormality occurs, the sub CPU 14B switches the steering assist command value Irefsub to be input to the sub ECU interlock 61 to zero, so as to make the sub ECU interlock disabled. This can prevent the monitoring of interlock with the abnormal torque value, and can prevent stopping of the assist immediately when such abnormality occurs. This allows the main CPU 14A to deal with the abnormality (ramp down control) securely.

The sub CPU 14B further compares the steering torque Ta input to the main ECU clip 34 of the main CPU 14A and the steering torque Ti detected by the torque sensor 3, and monitors whether the torque system abnormality generation flag is correct or not (validity of the abnormality detection result at the torque system abnormality detection unit 31) based on the result of the comparison.

That is, even when the torque system abnormality generation flag is ON, and when Ti=Ta and it is determined that the abnormal detection result at the torque system abnormality detection unit 31 is not appropriate, then control processing for the steering assist command value Irefsub to be input to the sub ECU interlock 61 is not performed, and the steering assist command value Iref limited by the main ECU clip 34 is input to the sub ECU interlock 61. In this way, the sub ECU interlock function can be made disabled only when abnormality occurs (this can prevent the sub ECU interlock function from being disabled unnecessarily), and so reliability can be secured.

The main CPU 14A is provided with the torque control system limiter diagnosis unit 35 to monitor the abnormality of the upper and lower limit clipping by the main ECU clip 34, which can suppress deterioration in reliability when the sub ECU interlock 61 is made disabled. That is, this torque control system limiter diagnosis unit 35 allows the main CPU 14A to have redundant design, and so reliability can be secured.

As stated above, the present embodiment enables abnormality processing without using the abnormal torque value when abnormality occurs in the torque system. Further, assist can be limited gently without immediately turning the assist OFF when the abnormality occurs, and so the system can be stopped safely while suppressing the driver's feeling of strangeness.

The entire contents of the Japanese Patent Application No. P2013-213074 (filed on Oct. 10, 2013) in which the priority right of the present patent application is claimed are herein incorporated by reference.

The explanation has been made by way of the limited number of embodiment. The scope of the claims is not limited to the above, and various modifications of the disclosed embodiments will be apparent to those skilled in the art.

REFERENCE SIGNS LIST

1 Steering wheel
2 Steering shaft
3 Steering torque sensor
8 Steering gear
10 Steering assist mechanism
13 Electric motor
14 Controller
15 Battery
16 Ignition switch
17 Vehicle-speed sensor
21 Command value calculation unit
22 Command value compensation unit
23 Motor control unit
24 Interlock mask unit
31 Torque system abnormality detection unit
32 Past torque control calculation unit
33 Steering assist command value calculation unit
34 Main ECU clip (q-axis current clip)
35 Torque control system limiter diagnosis unit
36 Phase compensation unit
37 Adder
38 Stabilization compensation unit
39 Responsiveness compensation unit
40 Adder
41 Angular speed calculation unit
42 Angular acceleration calculation unit 43 Friction/inertia compensation unit
44 Convergence compensation unit
45 Reaction force/hysteresis compensation unit
46 Subtracter
47 Current command value calculation unit
48 Subtracter
49 Current control unit
50 Motor driving unit
61 Sub ECU interlock (q-axis current interlock)

The invention claimed is:

1. An electric power steering apparatus comprising:
an electric motor configured to give a steering system a steering assist force to reduce steering load on a driver;
a torque detection unit configured to detect steering torque;
a steering assist command value calculation unit configured to calculate a steering assist command value at least based on the steering torque detected by the torque detection unit;
a clipping unit configured to limit, using a predetermined limiting value, the steering assist command value calculated by the steering assist command value calculation unit so as not to exceed an acceptable range based on the steering torque detected by the torque detection unit;
a motor control unit configured to perform driving control of the electric motor based on the steering assist command value limited by the clipping unit;
an interlock unit having a monitoring function to permit or prohibit the driving control of the electric motor by the motor control unit based on the steering torque detected by the torque detection unit and the steering assist command value limited by the clipping unit;
a torque abnormality detection unit configured to detect an abnormality of the steering torque detected by the torque detection unit;
a torque alternative value calculation unit configured to calculate a steering torque alternative value when the torque abnormality detection unit detects the abnormality, based on normal steering torque that is detected by the torque detection unit when the abnormality is not detected;
an input switching unit configured to switch an input value of the clipping unit from the steering torque detected by the torque detection unit to the steering torque alternative value calculated by the torque alternative value calculation unit, when the torque abnormality detection unit detects the abnormality; and
an interlock mask unit configured to switch an input value of the interlock unit from the steering assist command value limited by the clipping unit to zero, when the torque abnormality detection unit detects the abnormality.

2. The electric power steering apparatus according to claim 1, further comprising a main control unit and a sub control unit that are capable of performing data communication with each other, wherein
the main control unit includes the steering assist command value calculation unit, the clipping unit, the motor control unit, the torque abnormality detection unit, the torque alternative value calculation unit, the input switching unit, and the interlock mask unit, and
the sub control unit includes the interlock unit.

3. The electric power steering apparatus according to claim 1, further comprising a clipping abnormality detection unit configured to detect an abnormality at the clipping unit based on a comparison result between the steering assist command value input to the clipping unit and the steering assist command value output from the clipping unit.

4. The electric power steering apparatus according to claim 1, further comprising an abnormal detection result determination unit configured to determine validity of a result of abnormality detection by the torque abnormality detection unit based on a comparison result between the steering torque detected by the torque detection unit and the steering torque to be input to the clipping unit out of the steering torque detected by the torque detection unit and the steering torque alternative values calculated by the torque alternative value calculation unit, wherein
the interlock mask unit switches the input value of the interlock unit from the steering assist command value limited by the clipping unit to zero, only in a case in which the torque abnormality detection unit detects the abnormality and the abnormal detection result determination unit confirms the validity of the result of the abnormality detection by the torque abnormality detection unit.

5. The electric power steering apparatus according to claim 1, wherein the clipping unit comprises a gradually-changing unit configured to gradually change the limiting value toward zero, when the torque abnormality detection unit detects the abnormality.

6. The electric power steering apparatus according to claim 1, wherein the torque alternative value calculation unit calculates, as the steering torque alternative value, a minimum value of normal steering torque values detected by the torque detection unit within a predetermined period of time immediately before the torque abnormality detection unit detects the abnormality.

* * * * *